United States Patent [19]
Khan et al.

[11] Patent Number: 6,018,871
[45] Date of Patent: Feb. 1, 2000

[54] METHOD FOR MANUFACTURING A REDUCED MASS LOAD BEAM WITH IMPROVED STIFFNESS PROPERTIES

[75] Inventors: Aman Khan; Carlos Sanchez; Koji Iwamoto, all of Temecula, Calif.

[73] Assignee: Magnecomp Corp., Temecula, Calif.

[21] Appl. No.: 09/009,368

[22] Filed: Jan. 20, 1998

Related U.S. Application Data

[62] Division of application No. 08/782,721, Jan. 13, 1997, Pat. No. 5,812,342
[60] Provisional application No. 60/033,207, Nov. 27, 1996.

[51] Int. Cl.[7] ............................. A61C 5/10; B21F 43/00; B23P 13/00
[52] U.S. Cl. ........................ 29/896.9; 29/603.03
[58] Field of Search .............................. 29/896.9, 603.03, 29/603.04, 603.05, 603.06; 360/104

[56] References Cited

U.S. PATENT DOCUMENTS 5,126,904  6/1992  Sakurai ................................. 360/104

FOREIGN PATENT DOCUMENTS 59-213066  12/1984  Japan ..................................... 360/104
60-136979   7/1985  Japan ..................................... 360/104

*Primary Examiner*—P. W. Echols
*Attorney, Agent, or Firm*—Louis J. Bachand

[57] ABSTRACT

A disk drive suspension load beam having reduced mass for lessened shock in use and progressively modified stiffness and torsion values from its rearward portion to its forward portion is provided by trenching the rearward and/or intermediate portions to form on the flexure bearing, or opposite, face of the load beam a longitudinal series of transverse grooves in the rearward portion and in the intermediate portion inside the edge margin thereof, suitably cross-ribbed for stiffness, the rearward portion trenches being on the opposite face unless the intermediate portion is also trenched.

4 Claims, 2 Drawing Sheets

METHOD FOR MANUFACTURING A REDUCED MASS LOAD BEAM WITH IMPROVED STIFFNESS PROPERTIES

REFERENCE TO RELATED APPLICATION

This application is a Division of Ser. No. 08/782,721, filed Jan. 13, 1997, now U.S. Pat. No. 5,812,342, and further claims the benefit of U.S. Provisional application Ser. No. 60/033,207, filed Nov. 27, 1996.

BACKGROUND OF THE INVENTION

This invention has to do with disk drive suspensions, and more particularly with improvements in the load beam of a disk drive suspension to lower mass and inertia of the beam, to increase the flexibility of the beam in movement to and from the disk, and to increase the lateral and torsional stiffness of the beam, all by selective trenching of the beam, and to eliminate contamination problems inherent in previous beam modifications involving material removal.

Load beams carrying at their forward portion a gimballing assembly comprising a flexure and slider/magnetic head combination are mounted at their rearward portion to an actuator which shifts the load beam axially to carry the head to all desired portions of the disk.

BRIEF SUMMARY OF THE INVENTION

It is an object of the present invention to improve the design of disk drive suspension load beams. It is another object to modify the construction of a load beam to increase the lateral and torsional stiffness while reducing the beam stiffness in the vertical axis, and lowering the beam mass and the mass and of the beam and actuator taken together. It is another object to trench the load beam in areas where there is reduced likelihood of contamination in use of the load beam, and where material may be removed in a manner enhancing the desired properties of the load beam and minimizing the undesired properties of the load beam.

These and other objects of the invention to become apparent hereinafter are realized in a disk drive suspension load beam for mounting on an actuator, the load beam comprising an elongated spring member extending in a longitudinal plane and having a predetermined depth, the elongated spring member having a flexible rearward portion adjacent the actuator, a forward portion adapted to carry a flexure and slider on one side of the load beam, and a rigid intermediate portion therebetween; the spring member flexible rearward portion having a longitudinally distributed series of transverse trenches of a number, spacing, depth and width to increase the member flexible rearward portion lateral and torsional stiffness within the longitudinal plane while reducing load beam member rearward portion resistance to bending from the longitudinal plane, the trenches opening to the side of the load beam opposite the flexure and slider.

In this and like embodiments, typically, the load beam rearward portion trenches are etched into the rearward portion, not less than a majority of the trenches extend into the spring member a distance equal to from about 50% to about 60% of the predetermined depth of the member at the trenches, the spring member rearward portion has a perimetrical edge margin, the trenches having a width and number substantially to occupy the entire surface of the spring member rearward portion inside the perimetrical edge margin, the trenches are of substantially uniform width at their intersection with the surface of the rearward portion, and uniformly spaced from each other at the surface a distance substantially equal to their widths, not less than a majority of the trenches is of substantially the same width and depth throughout their extent and each is separated from one another by rearward portion surface lands of substantially the same longitudinal extent, the rearward portion trenches are chemically etched into the rearward portion, substantially all of the trenches extend into the spring member a distance equal to from about 50% to about 60% of the predetermined depth of the member at the trenches, and the spring member rearward portion has a perimetrical edge margin, the trenches having a width and number substantially to occupy the entire surface of the spring member rearward portion inside the perimetrical edge margin, the trenches being of substantially uniform width at their intersection with the surface of the rearward portion, uniformly spaced from each other by surface lands of substantially uniform longitudinal extent, and of substantially uniform width and depth throughout their extent.

In a preferred embodiment of the invention there is provided a disk drive suspension load beam adapted for mounting on an actuator, the load beam comprising an elongated spring member extending in a longitudinal plane and having a predetermined depth, the elongated spring member having a flexible rearward portion for mounting the beam to an actuator, a forward portion adapted to carry a flexure and slider, and a rigid intermediate portion therebetween, the intermediate portion having left and right edge rails, the intermediate portion being surface locally relieved between the edge rails in intermediate portion- and load beam-weight reducing relation.

In this and like embodiments, the spring member rearward portion has a plurality of trenches extending transversely of the spring member longitudinal axis, the spring member intermediate portion local relief defines between the edge rails a longitudinally extended series of transverse grooves which extend into the spring member a distance equal to from about 50% to about 60% of the predetermined depth of the member at the trenches, the spring member rearward portion has a perimetrical edge margin, its the trenches having a width and number substantially to occupy the entire surface of the spring member rearward portion inside the perimetrical edge margin, the trenches being of substantially uniform width at their intersection with the surface of the rearward portion, uniformly spaced from each other by surface lands of substantially uniform longitudinal extent, and of substantially uniform width and depth throughout their extent, the rearward portion trenches and the intermediate portion grooves are both formed in the surface of the load beam to which the flexure is attached, the rearward portion trenches and the intermediate portion grooves are formed in opposite surfaces of the load beam, the intermediate portion surface is locally relieved to have a series of lands and grooves laterally and longitudinally distributed across the intermediate portion surface between the left and right edge rails thereof, the locally relieved intermediate portion surface defines a series of lands and grooves lying transversely of the load beam intermediate portion longitudinal axis, the locally relieved intermediate surface portion defines a longitudinally extended series of grooves and lands lying transversely of the load beam intermediate portion longitudinal axis, the grooves being locally interrupted to define ribbing extending across a plurality of the grooves, the ribbing acting to stiffen the intermediate portion, the ribbing comprises multiple ribs extending radially from a common center located between the intermediate portion edge rails, the load beam rearward portion has a locus of transition to the intermediate portion at the intermediate portion left and right edge rails, and there are first and second ribs of the ribbing, the first and second ribs extending from the common center to the transition locus, there are third and fourth ribs of the ribbing, the third and fourth ribs extending at substantially a right angle to the first and second ribs toward the first and left edge rails of the load beam intermediate portion, and the ribbing further includes a fifth, longitudinal rib, the fifth rib extending from the common center toward the forward position.

The invention further typically includes the method of manufacturing a disk drive suspension load beam adapted to be mounted to an actuator and to carry a flexure and slider, including shaping the general form of the load beam to have a longitudinal axis, and to have rearward portion adapted to be mounted to an actuator, a forward portion adapted to carry a flexure, and an intermediate portion therebetween, forming edge rails on the intermediate portion, and transversely trenching the load beam in its rearward and intermediate portions to have trenches in the rearward portion and grooves in the intermediate portion between its the edge rails, the grooves being open to the face of the load beam where the flexure is to be mounted. The invention method further typically includes trenching the load beam rearward portion on the same face of the load beam as the intermediate portion is trenched, trenching the load beam rearward portion on the opposite face of the load beam as the intermediate portion is trenched, and locally interrupting the intermediate portion grooves to define intersecting ribbing crossing the intermediate portion in increased stiffening relation over the intermediate portion with no ribbing.

BRIEF DESCRIPTION OF THE DRAWINGS

The invention will be further described in conjunction with the attached drawings in which.

DETAILED DESCRIPTION OF THE INVENTION

Figure 1:
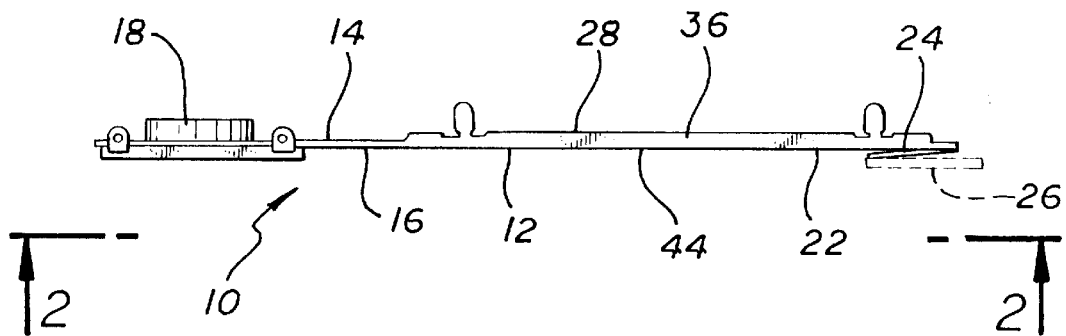
FIG. 1 is a side elevation view of the invention load beam.
Figure 1A:
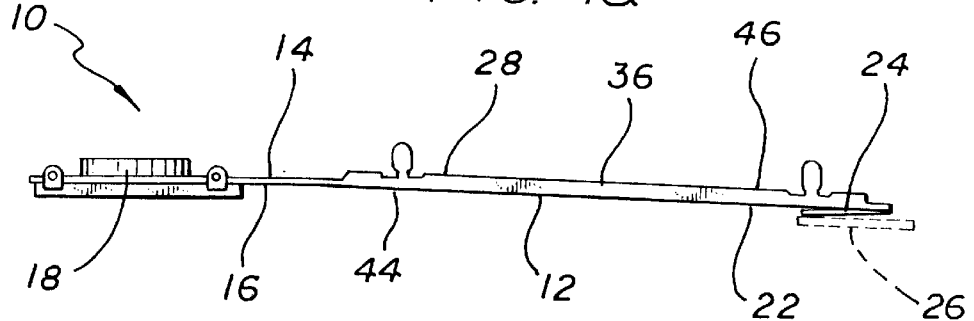
FIG. 1a is a view thereof in downwardly flexed condition.

The main function of a load beam is to suspend a flexure (gimbal) along with a slider/magnetic head assembly at a desired position and at the same time apply pre-load to the head assembly. The pre-load is exerted by the rearward spring area portion of the load beam. The remainder of the load beam length, i.e., the intermediate and forward portions are made stiffer either by forming edge rails or imparting a sharp bend (step) to the load beam along its longitudinal axis. A relatively longer load beam is desirable since the length of the actuator driving the load beam can then be relatively shorter, and the actuator mass smaller, enabling a reduced mass overall and less inertia, while still maintaining the ability to reach all the desired tracks on the disk.

In an ideal suspension, assuming a given length, the combination of low mass and low inertia, coupled with increased lateral and torsional stiffness, is desirable in the forward and intermediate portions of the load beam, particularly in the area between the edge rails. These portions have an insignificant effect on vertical stiffness. The rearward portion, pre-load spring area, however, does generate the vertical load for the slider/head assembly and desirably has a lower vertical stiffness to reduce the vertical direction sensitivity of the load beam as the base line (datum) of the suspension changes. An increase in rearward portion lateral/torsional stiffness, however, will improve resonance frequency.

As noted above, it is known to selectively remove material, e.g., partially etch, the rearward portion of the load beam on the load beam face to which the slider is attached to ameliorate the problem of undue stiffness in the spring area only. In that way the bending resistance (which is related to vertical stiffness of the load beam) is reduced as a cubic function of thickness ratio. Lateral stiffness, however, is reduced by etching only linearly, so partial etching does not reduce the lateral stiffness in the same proportion as it does vertical stiffness. This positioning of the etching has led to operating difficulties and lowered long term reliability for the products. The relocation of the rearward portion etch to the opposite face of the load beam from the slider, and the location of etching of the intermediate portion, if done, between the rails will avoid the consequences of having the rearward portion of the slider-bearing face of the load beam etched, including potential collection of contamination, such as shavings of materials contacted by the load beam. For example, as a head gimbal assembly, including a load beam and slider combination is built into head stack assembly, the separating comb placed between the load beams can potentially collect debris. Placing the rearward portion etched area where it is protected by the rails from shaving contact with other materials will prevent material shaving, debris generation, and contamination, and improve product life and performance.

In this invention, partial etching is used on the opposite face of the load beam from the slider bearing face, and the noted difficulties are avoided while maintaining benefits.

In addition, the intermediate portion of the load beam, the area between the rails, is also partially etched, either on the same face of the load beam that bears the slider, or on the opposite face of the load beam.

In certain embodiments, both the opposite face of the rearward portion and the opposite or same face of the intermediate portion are both partially etched to realize the advantages mentioned herein.

Preferably, the etching or material removal in the intermediate portion is between the rails and on opposite side from the slider on the load beam, and the rearward portion etching is also on that side of the load beam.

This invention uses the etching or other method of selective material removal to not only reduce vertical stiffness of the load beam in the rearward portion spring area and without incurring contamination problems owing to the different area of such removal, but also employs material removal in the intermediate portion to selectively reduce the vertical stiffness and also reduce the load beam mass, and thus the inertia of the load beam. The reduction of the mass is proportional to etch depth. The reduction of inertia is proportional to etch depth and to the distance of the center of gravity from the axis of vertical rotation about the horizontal plane.

In the invention, partial etching in the indicated areas reduces the mass of the suspension without adversely affecting lateral and torsional stiffness values. The invention achieves a reduced suspension mass, and thus a lowered mass moment of inertia by reducing the centroid distance from the mount plate in comparison with the identical suspension in which there has been no material removal in the load beam intermediate portion between the rails.

Figure 2:
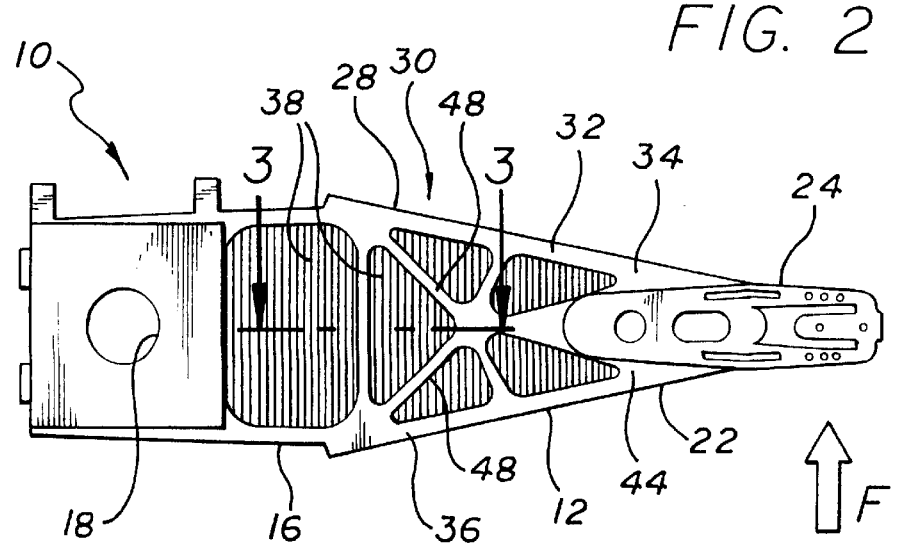
FIG. 2 is a bottom plan view thereof taken on line 2—2 in FIG. 1.
Figure 3:
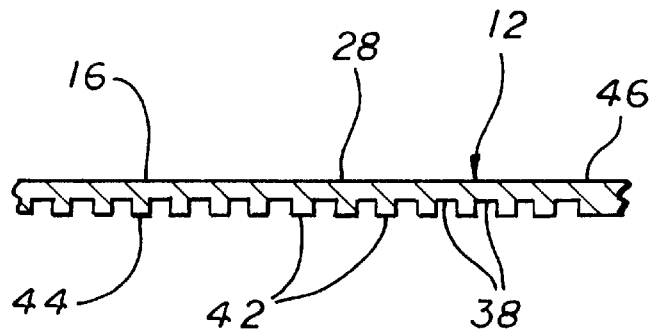
FIG. 3 is a view taken on line 3—3 in FIG. 2.

With reference now to the drawings in detail, in FIGS. 1, 1a, 2 and 3, the disk drive suspension load beam is shown at 10 and comprises an elongated spring member 12, extending in a longitudinal plane and having a predetermined depth best seen at 14 (FIGS. 1 and 1a) and in FIG. 3. The load beam member 12 may be considered to comprise three portions, including a flexible rearward portion 16, arranged to be adjacent the actuator (not shown) to which the load beam member is attached by means of boss 18. The load beam member 12 further includes a forward portion 22 adapted to carry a flexure 24 and a slider 26 thereon in the conventional manner. Between the load beam member 12 rearward portion 16 and forward portion 22, the member has an intermediate portion 28 making up the balance of the load beam member length, generally lying between the left and right hand side rails 34, 36, and having a greater stiffness than the rearward portion.

In a first embodiment of the invention, the intermediate portion 28 is trenched in the area 30 generally extending from the member 12 edge margin 32 extending inward from inside the rails 34, 36 across the width of the member intermediate portion. Trenching is effected typically by etching into the unmasked areas of the member intermediate portion 28, or by any other suitable trenching means, a pattern which suitably takes the form of a longitudinally distributed series of transverse cuts or grooves, referred to as trenches 38 herein, which are distributed along the longitudinal axis of the member 12 with adjacent trenches succeeding one another higher or lower on the longitudinal axis, in parallel and spaced from each other a distance equal, i.e., to each other and or equal to the trench 38 width across lands 42, as later herein described. See FIG. 3. The specific pattern of trenching is not narrowly critical provided the trenches remove mass in an effective amount from the member 12, are precisely definable, are of a desired depth, and provide stiffness properties of a particular value desired, i.e., are conductive in number, shape, spacing, depth, width, and location to achievement of the reduction in mass and desired stiffness values. For example, a series of transverse trenches as shown in FIGS. 2 and 3, being transverse and regular will enhance the lateral stiffness of the member intermediate portion 28, and its torsional resistance as well.

It will be noted that the trenched area 30 is cut into the member 12 on the obverse side 44 of the member where the flexure 24 is supported, and not the member reverse side 46. The rearward portion 16 of the load beam member 12 is also trenched in this embodiment, and on the same member side 44 as the intermediate portion, giving in cross-section the appearance shown in FIG. 3.

For added stiffness property control, the trenched area 30 is ribbed as shown, in a radiating pattern of ribs 48 or in some other satisfactory pattern for desired stiffness properties.

Figure 5:
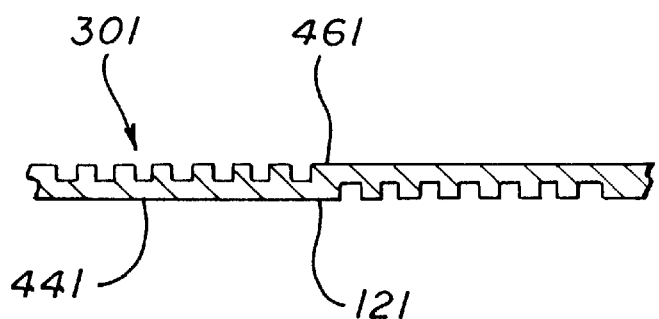
FIG. 5 is a view taken on line 5—5 in FIG. 4.
Figure 4:
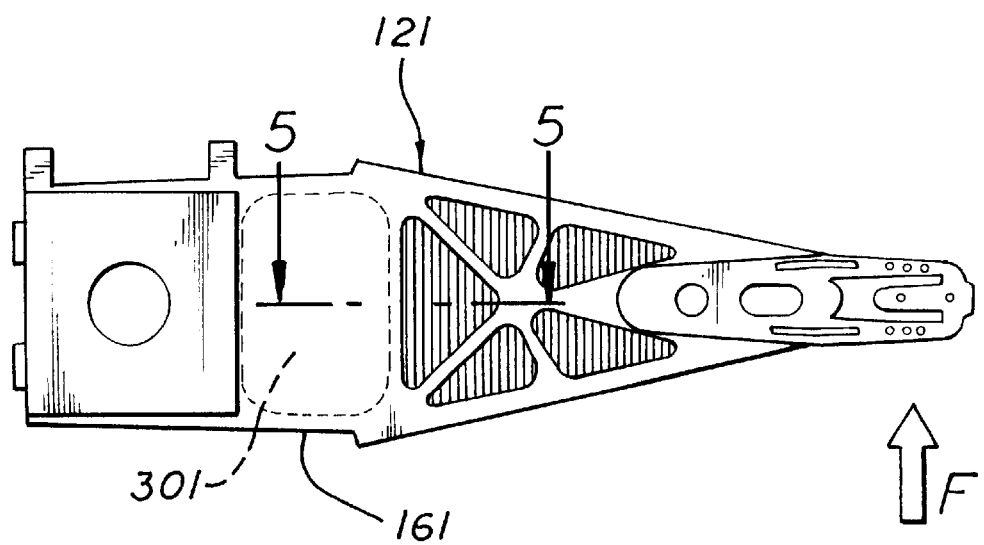
FIG. 4 is a view like FIG. 2 of an alternate embodiment.

In FIGS. 4 and 5 an alternate arrangement is shown wherein the rearward portion 161 has trenched area 301 on the reverse side 461 of load beam member 121, as best shown in FIG. 5. This trenching arrangement provides the desired properties in terms of mass reduction and torsional and lateral stiffness while avoiding problems experienced when the obverse side 441 is trenched and shaving contamination may occur as noted above.

The foregoing objects of the invention are thus met.

What is claimed is:

1. The method of manufacturing a disk drive suspension load beam adapted to be mounted to an actuator and to carry a flexure and slider, including shaping the general form of said load beam, said load beam having a longitudinal axis extending in a longitudinal plane, a rearward spring portion adapted to be mounted to an actuator, a forward portion to carry a flexure, and a rigid intermediate portion therebetween, forming edge rails on said rigid intermediate portion; and transversely trenching said load beam in its rearward and intermediate portions to define a longitudinal series of parallel lands and grooves disposed transversely of said rearward portion and of a number, spacing, depth and width to substantially occupy the entire surface of said portions to increase said load beam flexible rearward portion lateral and torsional stiffness while reducing said rearward portion resistance to bending from said longitudinal plane, said grooves being open and of unchanged width from their depth to the face of said load beam where said flexure is to be mounted.

2. The method according to claim 1, including effecting said trenching of said load beam rearward portion on the same face of said load beam as said intermediate rigid portion is trenched.

3. The method according to claim 1, including effecting said trenching of said load beam rearward portion on the opposite face of said load beam as said intermediate portion is trenched.

4. The method according to claim 1, including locally interrupting said intermediate portion grooves to define intersecting ribbing crossing said intermediate portion in increased stiffening relation over said intermediate portion with no ribbing.

\* \* \* \* \*